United States Patent
Gruchalski

(10) Patent No.: US 10,843,707 B2
(45) Date of Patent: Nov. 24, 2020

(54) PROACTIVE CONTROL OF AN ASSISTANCE SYSTEM OF A MOTOR VEHICLE

(71) Applicant: AUDI AG, Ingolstadt (DE)

(72) Inventor: Gerd Gruchalski, Ingolstadt (DE)

(73) Assignee: Audi AG, Ingolstadt (DE)

( * ) Notice: Subject to any disclaimer, the term of this patent is extended or adjusted under 35 U.S.C. 154(b) by 156 days.

(21) Appl. No.: 16/314,981

(22) PCT Filed: Jun. 28, 2017

(86) PCT No.: PCT/EP2017/066066
§ 371 (c)(1),
(2) Date: Feb. 26, 2019

(87) PCT Pub. No.: WO2018/007229
PCT Pub. Date: Nov. 1, 2018

(65) Prior Publication Data
US 2019/0202478 A1    Jul. 4, 2019

(30) Foreign Application Priority Data
Jul. 8, 2016   (DE) .................. 10 2016 008 365

(51) Int. Cl.
*B60W 50/14* (2020.01)
*B60W 30/18* (2012.01)
(Continued)

(52) U.S. Cl.
CPC ........... *B60W 50/14* (2013.01); *B60W 30/02* (2013.01); *B60W 30/18163* (2013.01);
(Continued)

(58) Field of Classification Search
None
See application file for complete search history.

(56) References Cited

U.S. PATENT DOCUMENTS 8,290,513 B2 * 10/2012 Forstall ............. G01C 21/3697
455/456.3
8,606,455 B2   12/2013 Boehringer et al.
(Continued)

FOREIGN PATENT DOCUMENTS

CN    102640197 A    8/2012
CN    104412068 A    3/2015
(Continued)

OTHER PUBLICATIONS

International Search Report and Written Opinion of the International Searching Authority directed to related International Patent Application No. PCT/EP2017/066066, dated Oct. 17, 2017, with attached English-language translation; 23 pages.
(Continued)

*Primary Examiner* — Thuykhanh Le
(74) *Attorney, Agent, or Firm* — Sterne, Kessler, Goldstein & Fox P.L.L.C.

(57) ABSTRACT

The assistance system of a motor vehicle includes a driver-assistance system for monitoring a driving situation of the motor vehicle and a control device for determining at least one course of option resulting from the monitored driving situation, by taking into consideration data that can be retrieved by the control device independently of a user input to the assistance system. The assistance system also includes an output device for outputting a query to provide to a driver a function of the assistance system corresponding to a course of action. The assistance system also includes a detection device for detecting a response reaction of the driver. The control device provides the function of the assistance system depending on the detected response to reduce the cognitive load of the driver.

20 Claims, 1 Drawing Sheet

(51) Int. Cl.
*G10L 15/22* (2006.01)
*G01C 21/36* (2006.01)
*B60W 50/08* (2020.01)
*B60W 30/02* (2012.01)

(52) U.S. Cl.
CPC ............ *B60W 50/08* (2013.01); *G01C 21/36* (2013.01); *G01C 21/3664* (2013.01); *G01C 21/3697* (2013.01); *G10L 15/22* (2013.01); *B60W 2530/14* (2013.01); *B60W 2540/21* (2020.02)

(56) References Cited

U.S. PATENT DOCUMENTS

| | | | | |
|---|---|---|---|---|
| 8,897,926 | B2* | 11/2014 | Stahlin | B60W 50/085 |
| | | | | 701/1 |
| 9,159,235 | B2* | 10/2015 | Hegemann | G08G 1/16 |
| 9,493,169 | B2* | 11/2016 | Ebner | B60R 16/037 |
| 9,511,779 | B2* | 12/2016 | Cullinane | B60W 30/00 |
| 9,862,290 | B2* | 1/2018 | Yamada | B60N 2/0224 |
| 10,692,149 | B1* | 6/2020 | Loo | G06Q 40/08 |
| 2004/0128057 | A1* | 7/2004 | Kitazawa | F02D 11/105 |
| | | | | 701/110 |
| 2009/0248231 | A1* | 10/2009 | Kamiya | G05D 1/0061 |
| | | | | 701/23 |
| 2010/0088093 | A1* | 4/2010 | Lee | G10L 15/22 |
| | | | | 704/233 |
| 2010/0121645 | A1* | 5/2010 | Seitz | B60K 35/00 |
| | | | | 704/275 |
| 2011/0130913 | A1* | 6/2011 | Duggan | B64C 19/00 |
| | | | | 701/23 |
| 2013/0030811 | A1* | 1/2013 | Olleon | G06F 3/013 |
| | | | | 704/267 |
| 2013/0033384 | A1* | 2/2013 | Pierlot | G08G 1/0112 |
| | | | | 340/905 |
| 2014/0156133 | A1* | 6/2014 | Cullinane | B60R 16/023 |
| | | | | 701/23 |
| 2014/0249722 | A1* | 9/2014 | Hegemann | G08G 1/166 |
| | | | | 701/41 |
| 2014/0280051 | A1* | 9/2014 | Djugash | B60W 50/08 |
| | | | | 707/722 |
| 2014/0365228 | A1* | 12/2014 | Ng-Thow-Hing | G06N 20/00 |
| | | | | 704/275 |
| 2015/0035666 | A1* | 2/2015 | Scofield | B60W 40/09 |
| | | | | 340/439 |
| 2015/0177012 | A1* | 6/2015 | Cooper | B61L 3/006 |
| | | | | 701/416 |
| 2016/0033964 | A1* | 2/2016 | Sato | B60K 28/06 |
| | | | | 701/24 |
| 2016/0061621 | A1* | 3/2016 | Hawkins | G06Q 30/0267 |
| | | | | 701/408 |
| 2016/0061625 | A1* | 3/2016 | Wang | G08G 1/012 |
| | | | | 701/454 |
| 2016/0121805 | A1* | 5/2016 | Forsgren | B60K 37/04 |
| | | | | 348/837 |
| 2016/0180712 | A1* | 6/2016 | Rosen | G01C 21/3685 |
| | | | | 705/5 |
| 2016/0207536 | A1* | 7/2016 | Yamaoka | B60W 50/10 |
| 2016/0264021 | A1* | 9/2016 | Gillett | B60K 7/0007 |
| 2016/0304123 | A1* | 10/2016 | Lewis | B62D 5/0478 |
| 2016/0304124 | A1* | 10/2016 | Fujiyoshi | G05D 1/0061 |
| 2016/0347314 | A1* | 12/2016 | Kuwahara | B60W 10/184 |
| 2017/0028987 | A1* | 2/2017 | Yamada | B60N 2/062 |
| 2017/0057542 | A1* | 3/2017 | Kim | B62D 1/28 |
| 2017/0220039 | A1* | 8/2017 | Funakawa | B60W 50/14 |
| 2017/0303842 | A1* | 10/2017 | Yoshida | A61B 5/18 |
| 2018/0065640 | A1* | 3/2018 | Barthel | B60W 40/06 |
| 2018/0118223 | A1* | 5/2018 | Mori | B60K 35/00 |
| 2018/0120844 | A1* | 5/2018 | Okamoto | B60W 30/14 |
| 2018/0225975 | A1* | 8/2018 | Park | G08G 1/052 |
| 2019/0054928 | A1* | 2/2019 | Hatano | B60W 60/0057 |
| 2019/0072403 | A1* | 3/2019 | Sakai | G01S 13/93 |

FOREIGN PATENT DOCUMENTS

| | | |
|---|---|---|
| CN | 105711596 A | 6/2016 |
| DE | 102009008142 A1 | 8/2010 |
| DE | 102009048954 A1 | 4/2011 |
| DE | 102011016080 A1 | 11/2011 |
| DE | 102012004601 A1 | 10/2012 |
| DE | 102011121110 A1 | 6/2013 |
| DE | 102012022630 A1 | 6/2013 |
| DE | 102013209780 A1 | 12/2013 |
| DE | 102013102087 A1 | 9/2014 |
| DE | 102014203138 A1 | 10/2015 |
| DE | 102014224120 A1 | 6/2016 |

OTHER PUBLICATIONS

International Preliminary Report on Patentability directed to related Inteimitional Patent Application No. PCT/EP2017/066066, dated Oct. 29, 2018, with attached English-language translation; 14 pages.

* cited by examiner

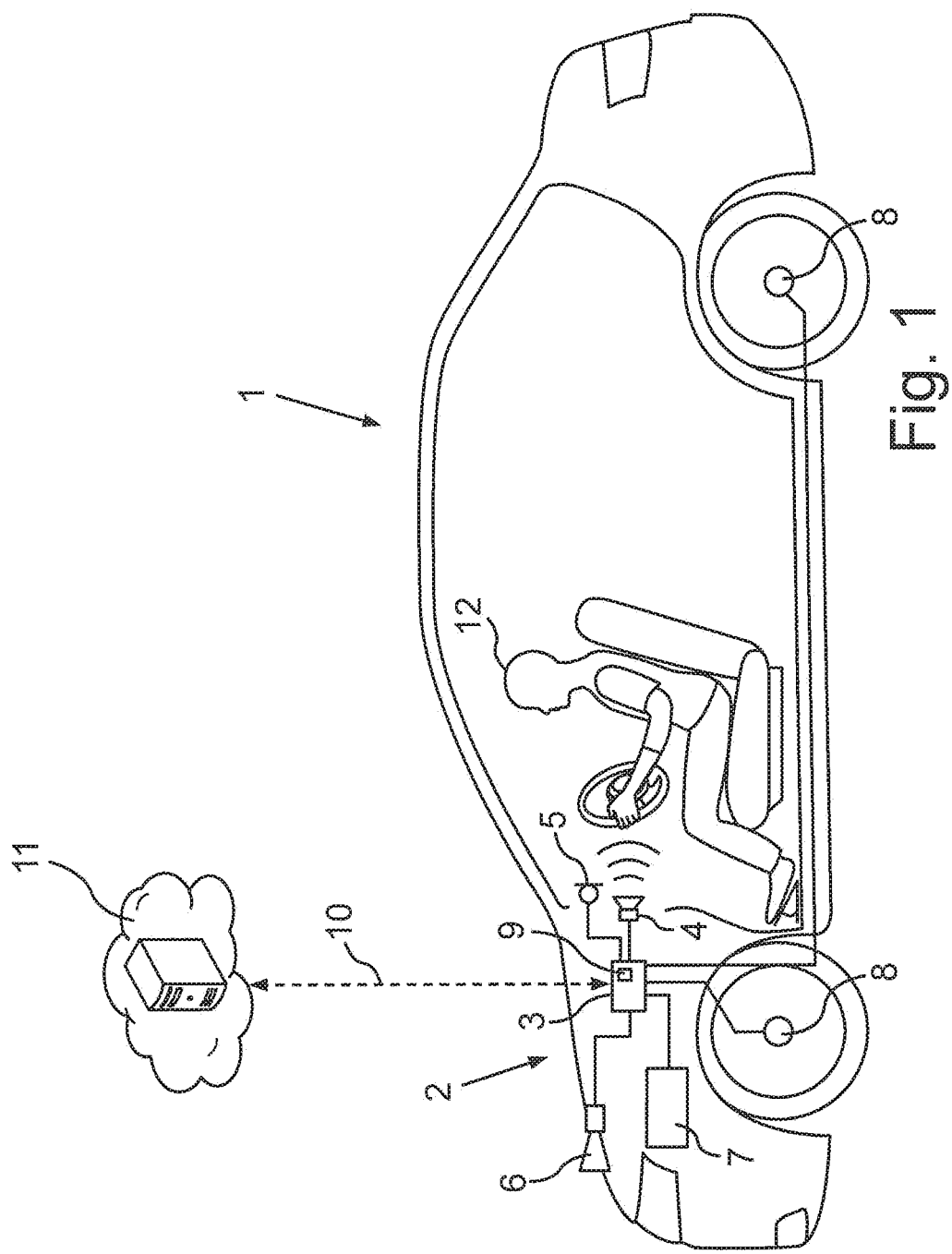

PROACTIVE CONTROL OF AN ASSISTANCE SYSTEM OF A MOTOR VEHICLE

TECHNICAL FIELD

The invention relates to a method for controlling an assistance system of a motor vehicle, wherein the assistance system comprises a driver-assistance system. The invention also relates to an assistance system for a motor vehicle having a driver-assistance system, which is configured to monitor a driving situation of the motor vehicle.

BACKGROUND

Typically, it is always the driver of a motor vehicle, who actively steers the motor vehicle and must monitor the traffic accordingly. Therefore, there is considerable demand to minimize driver distraction by means of additional devices and systems in the motor vehicle, such as driver-assistance systems. In this context, it has been shown that voice operation is advantageous in relation to manual operations of vehicle functions when it comes to minimized driver distraction. Nowadays, voice operation thereby often focuses on entertainment and convenience functions of an assistance system.

For example, DE 10 2011 121 110 A1 discloses a method for operating a voice dialog system in a vehicle, in which a voice dialog system status associated with a voice dialog is determined and depicted in color. Voice input is thereby also recorded and compared to stored voice commands.

DE 10 2012 022 630 A1 discloses a method for a driver to communicate with a driver-assistance system. A voice input is thereby recorded, which is analyzed in a syntactic and semantic manner by a data processing unit. Key words are thereby detected, which are stored in a database and available in a processed manner so that one can then assign one or more operating parameters to the key words. From the operating parameters, one generates output information, which is used for conveying information to the driver via voice output. In this way for example, a driving speed can be adjusted in autonomous driving modes of a motor vehicle. In this case, the system can issue a query back to the driver if an input was too unclear.

BRIEF DESCRIPTION OF THE DRAWINGS/FIGURES

FIG. 1 illustrates a schematic representation of an assistance system in a motor vehicle, according to some embodiments of this disclosure.

DETAILED. DESCRIPTION

Therefore, the object is to reduce the cognitive load on a driver by means of an assistance system and to thereby in particular increase convenience and road safety.

This object is achieved by the respective subject matter of the independent claims. Advantageous designs are derived from the dependent claims, the description and the drawings.

The invention relates to a method for controlling an assistance system of a motor vehicle, wherein the assistance system comprises or is a driver-assistance system. A first step is thereby the monitoring of a driving situation of the motor vehicle (in which the motor vehicle finds itself), which may comprise in particular a driving mode of the motor vehicle, by the driver-assistance system of the motor vehicle. The monitored driving situation may also comprise a future driving situation of the motor vehicle resulting from a current driving situation with a specified probability. Monitoring may also involve in particular repetitive or continuous monitoring. A next step in this case is a control device of the assistance system determining at least one course of action for the driver resulting from the monitored driving situation. For example, from the fact that the motor vehicle is on a highway, activation of a partially automated or fully automated driving function of the driver-assistance system can be determined in this way as a resulting course of action for the driver. As a resulting course of action, it may also be determined for example from routine information of a navigation system of a motor vehicle, which is part of the driver-assistance system, that a partially automated or fully automated driving function of the driver-assistance system is deactivated at a future point in time or at a future position to be reached by the vehicle according to the route information. For example, this may be the case when the motor vehicle arrives at a section of the route after the position to be reached, which is reached at a future point in time, in other words in a period of a few minutes for example, and there is a reason for deactivating the partially or fully automated driving function, as may be the case for example due to a construction site or also leaving the highway.

The resulting course of action can thus comprise both adjusting at least one of the assistance system functions already provided or activated by the assistance system as well as providing at least one not yet activated function of the assistance system. This respective function shall hereinafter be referred to as the assistance system function corresponding to the course of action. The corresponding function or corresponding functions may thereby comprise driving functions of the driver-assistance system as well as information and/or convenience functions of the assistance system. This determination thereby takes place taking into account, in particular exclusively taking into account, data that can be retrieved using the control device independently of user input to the assistance system. The data can thus be stored in the assistance system, vehicle or vehicle-external computing device such as a cloud.

An additional step is outputting a query to provide an assistance system function to the driver corresponding to the determined course of action by means of an output device of the assistance system. Similar to the explanations above, the provision here comprises in particular also providing an adjusted already activated function of the assistance system, in other words an adjustment of an already provided and/or activated function of the assistance system. An additional step is then a detection device of the assistance system detecting a response reaction of the driver and the control device providing the assistance system function depending on the detected response. The provision depending on the detected response may also comprise in particular controlling and/or adjusting the function of the assistance system.

This has the advantage that, of its own accord, the assistance system or system provides the driver with instructions and information or can ask him proactively for a required decision. In particular if, in a partially autonomous or autonomous driving mode, so-called piloted driving, the assistance system is uncertain in a driving situation, in other words does not arrive at a clear result, the assistance system can of its own accord offer the driver one or more courses of action and the assistance system can correspondingly steer depending on the response reaction or instruction of the driver. Since in piloted driving the driver is no longer active in the driving process, he is largely relieved of a cognitive load until the piloted driving ends and the driver must actively take over control once again. Nonetheless, assistance system can inform and/or query the driver for a decision, if for example a change in the driving situation or other need in this respect occurs, particularly in other words if a new or modified course of action results for the driver. The one or more courses of action may thereby form a subset of all possible courses of action for the driver, and may only be two or three courses of action for example. This substantially increases convenience, especially during piloted driving, and in the event of problem situations it also creates increased safety. By the fact that the system acts proactively, the driver is also not required to visualize, in every driving situation, all possible courses of action, which also pertain to the various functions of modern assistance or driver-assistance systems; instead the system takes a burden off the driver and offers him only reasonable functions, which correspond to the courses of action resulting or derived from the monitored driving situation. The vehicle-side initiative without a prior, assistance system-activating command or a corresponding query activating the assistance system or a function of the assistance system, thus allows the driver to direct his full attention to the driving process or other tasks important to him, and thereby results in cognitive load reduction, which increases safety and convenience. In the operating concept, the basic paradigm shift is thereby reflected in the environment of the driver, which is associated with the change from manually controlled driving to partially or fully automated, or piloted, driving with modified requirements and demands placed on the driver.

An advantageous design provides that a voice output device of the assistance system issues the query. The query can thus comprise a voice signal. This has the advantage that the query reaches the driver independently of a body position, which is advantageous particularly during piloted driving. In that case, the steering wheel is no longer touched in many situations and from sitting in a relaxed position, some additional operating elements may no longer be within easy reach. Due to the fact that a voice output can also occur in a non-directional manner, the driver is also not visually distracted from traffic events, or is not required to direct his attention to spatial areas that do not pertain to the traffic events.

An additional advantageous design provides that the assistance system comprises an information-entertainment (or infotainment) system, and the assistance system function comprises or is a function of the information-entertainment system. The function thereby provides information and/or entertainment content. The information and/or entertainment content is thereby adapted particularly to a custom of the driver stored in the assistance system or driver-assistance system and/or to a destination stored in the driver-assistance system and/or to a route stored in the driver-assistance system and/or drive duration stored in the driver-assistance system and/or to an appointment calendar stored in the assistance system. In this case, stored refers saved and/or retrievable. For example, an appointment calendar on file remotely stored in a cloud may be transferred to the assistance system and is thereby saved in it and is available for use. In particular, the method may apply in this case to a driving situation in an at least partially autonomous, particularly partially autonomous or autonomous, driving mode, in other words piloted driving. Specifically in this case, the travel time freed up by the piloted or (partially) autonomous driving may provide the driver with additional benefits, which are maximized by the mentioned designs.

In this way for example, preselected, longer-lasting or multipart functions or services of the assistance system, such as playing a movie or audio book, can be offered on longer drives, while shorter-duration functions or services, such as a music service, can be offered instead on shorter drives. During piloted drives lasting several hours, it is possible to have podcasts for example, particularly multipart podcasts on more complex topics and/or continuing education products and services, such as interactive language courses and their compilation and playback. In general, one can thereby design a personal, intelligent assistance function, which assists and entertains the driver particularly on longer drives, and can thereby relieve the driver of tedious and cognitively burdensome preselection process, and thereby provide custom-tailored functions, taking into account the mentioned aspects, such as stored habits or stored destinations and similar.

Another design provides that the response reaction is a voice response and the response reaction is detected by a voice detection device of the assistance system. Particularly when a response reaction is not detected in this case, particularly when a clear response reaction is not detected, a current status can be maintained, or control over driving is returned to the driver during piloted driving, in other words the at least partially autonomous driving mode can thus be ended. This has the advantage that the system can be operated in a particularly convenient manner and is independent of the physical posture of the driver. In this way, even during piloted driving, in which for example the steering wheel is not touched or other operating elements are not within easy reach, the assistance system can be controlled in a reliable and convenient manner, without the driver having to search for operating elements for example.

Another particularly advantageous design provides that, in the monitored driving situation, the motor vehicle is in an at least partially autonomous, in other words particularly a partially autonomous or highly autonomous or fully autonomous driving mode. This has the advantage that particularly most of the courses of action, which are offered to the driver by the freed-up driving time or by the lesser engagement of cognitive capacities of the driver to the driving process, are limited in a particularly targeted manner by means of the assistance system, so that particularly substantial benefits result. Should the traffic situation or vehicle status change in a manner that the driver may have missed, the assistance system can provide the driver an instigating, i.e., proactive query or response. Especially in ambiguous driving situations, proactively outputting a query to provide an assistance system function is advantageous. In this case, outputting the query may also comprise issuing a proactive warning or a proactive instruction. Warnings or instructions are proactive when they pertain to a future driving situation, which follow or result from a current driving situation with a specified minimum level of probability.

Another advantageous design provides that the function of the assistance system comprises or is a function of the driver-assistance system. The function can assist particularly the driver while driving and/or take over the driving for him. Preferably, the function assists the driver in a current driving situation. In particular, the function comprises a function, which pertains or comprises route guidance provided by the driver-assistance system. In this way, the assistance system can for example on its own initiative propose an alternative route to bypass an obstacle, such as a traffic jam and/or an accident for example. The alternative route is thereby proposed particularly on its own initiative when the obstacle was not present at the time of departure, in other words when the initial route guidance was generated. The function can also pertain to an overtaking procedure and/or a driving lane selection and/or a driving lane change. The function may thereby be or comprise an at least partially autonomous function. This has the advantage that the driver is relieved of a burden in a particularly effective manner, since the functions of the driver-assistance system can relieve the driver of tasks engaging an especially large number of resources. This is especially pronounced for functions, which pertain to or comprise route guidance or a current driving situation, such an overtaking procedure and/or driving lane selection or a driving lane change.

It may thereby be provided that the function of the driver-assistance system comprises a drive-stabilizing function, for example traction control. Here in particular, this may comprise issuing a warning to the driver. This has the advantage that safety is increased to an especially large degree.

A particularly advantageous design provides that by the control device determining the courses of action, which can comprise in particular an adjustment of an already provided or activated function, two different results are delivered, which are classified by the control device as being equivalent, and the query to provide the function pertains to making a selection among the functions allocated to the courses of action, particularly among the various adjusted functions, which correspond to the various results. It may be provided in this case also that if in determining the courses of action by the control device, at least two different results are provided, which are classified as equivalent by the control device, the query for providing the function pertains to making a selection among the functions, which correspond to the two different results. The control device can thereby decide, particularly by means of a predefined and/or predefinable criterion, when the results are classified as equivalent. Therefore, the results must not be equivalent within the meaning of having the same effect, but can for example also only have a large similarity in terms of the criterion so that the criterion opts for the results by less than a predefined amount. Therefore in general, according to the criterion, a query and/or confirmation can be considered reasonable for the results and be subsequently carried out. By means of the criterion, a context of the current driving situation and/or a history stored in the control device and/or a driver profile can also be taken into account. In addition to the (driving) situations in which the driver-assistance system makes autonomous decisions, the driver-assistance system can thereby be configured to not make its own decisions in predefined driving situations, but to ask the driver on its own initiative.

This has the advantage that by means of the assistance system, the driver is not only relieved of a cognitive load in driving situations that are clear to the assistance system, but also in ambiguous situations in which the control device or the assistance system itself do not find a clear solution. However, by the preselection of the control device, the cognitive load is reduced for the driver in these situations also, and safety and convenience are increased. As a result, the driver can respond faster in an ambiguous driving situation for example.

Alternatively or additionally, the driver-assistance system can be configured to make autonomous decisions in predefined driving situations, but thereby inform the driver about the decision and particularly also a reason for the decision. This has the advantage that the confidence of the driver in the driver-assistance system is reinforced since the driver obtains additional information about the behavior of the motor vehicle. Cognitive load relief is thereby also achieved.

An additional advantageous design provides that the control device fir determining courses of action evaluates user- and/or vehicle- and/or world-related data. User-related data may involve particularly electronic calendars and/or electronic messages and/or a usage history of the assistance system. Vehicle-related data may comprise in particular a vehicle status and/or a road status and/or a driving status and/or traffic data. World-related data may comprise in particular news and/or weather information. The data can thereby be retrieved in particular by the control device of a remote computing device, for example a so-called cloud. This has the advantage that the at least one course of action of the driver can be predicted or determined in a particularly accurate manner, and thus the corresponding function, which is allocated to the respective course of action, can also be offered in a manner that is particularly accurate and apt for the driver.

The invention also relates to an assistance system for a motor vehicle having a driver-assistance system, which is configured to monitor a driving situation of the motor vehicle. The driver-assistance system can also be configured to provide a driving function at least in a partially automated, in other words partially, highly, or fully automated, manner within the scope of so-called piloted driving for example. A key factor here is an assistance system control device that is configured to determine a course of action for the driver resulting from the monitored driving situation, namely by taking into account data that can be retrieved by the control device independently of user input to the assistance system. The assistance system also comprises an output device, which is configured to output a query to provide an assistance system function, corresponding to a course of action, to the driver. A detection device, which is configured to detect a driver response reaction, is also part of the assistance system. The control device is thereby still configured to provide the assistance system function depending on the detected response.

Advantages and advantageous designs of the assistance system correspond here to advantages and advantageous designs of the method described.

The invention also relates to a motor vehicle having such an assistance system.

The features and combination of features mentioned precedingly in the description, as well as the features and combination of features mentioned in the drawing description below and/or shown in the drawing alone cannot only be used in the respective combination indicated, but also in other combinations, without departing from the scope of the invention. Therefore, designs of the invention, which are not explicitly shown and explained in the drawing, but emerge from and can be produced by separated combinations of features from the explained designs shall also be considered comprised and disclosed. Explanations and combinations of features, which thereby do not have all the features of an originally worded independent claim, shall also be considered as disclosed. In addition, explanations and combinations of features, which extend beyond or deviate from the combination of features set forth in the references of the claims shall be considered as disclosed, particularly by the explanations provided above.

Embodiments of the invention are explained in greater detail below by means of a schematic drawing—FIG. 1.

FIG. 1 depicts an illustrative embodiment of an assistance system in a motor vehicle.

In FIG. 1, motor vehicle 1 has an assistance system 2, which in this case comprises, in addition to a control device 3, also an output device 4 designed here as a voice output device as well as a detection device 5 designed here as a microphone. Furthermore, assistance system 2 comprises a monitoring unit 6 designed here as a camera. In this case, control device 3 is also coupled to a motor 7 and wheel systems 8. In this case, assistance system 2 thereby also comprises a driver-assistance system, by means of which a driving situation of the motor vehicle can be monitored here, and, in the depicted example, piloted driving, in other words partially autonomous or highly autonomous or fully autonomous driving, can be executed.

In the depicted example, control device 5 also comprises a position detection module 9, by means of which a position of motor vehicle 1 can be determined. Accordingly, in the depicted embodiment a navigation system is also part of assistance system 2.

In the depicted example, control device 3 is also linked via a wireless connection 10 to a vehicle-external computing device 11, in this case a so-called cloud, and can retrieve data, such as traffic and/or weather information, from the latter. In the depicted example, this data can thereby be taken into account as a function of the position of motor vehicle 1 detected by position detection module 9.

Now for example, a driving situation of motor vehicle 1 can thus be monitored by using data from monitoring device 6 as well as traffic status or traffic congestion information, retrieved from remote computing device 11. In addition, route guidance stored in the driver-assistance system can also be taken into account, for example.

From the monitored driving situation, which may also comprise a future driving situation resulting from the monitored driving situation with a predefined minimum probability, of motor vehicle 1, control device 3 now determines a resulting course of action for a driver 12 of motor vehicle 1. This takes place taking into account data that can be retrieved by control device 5 independently from a user input by driver 12 to assistance system 2. For example, this may be sensor data of motor vehicle 1 and/or automatic route guidance data of a navigation system and/or data from remote computing device 11.

Thereupon, output device 4 outputs a query to driver 12 to provide a function of assistance system. 2 corresponding to a course of action of driver 12. Since assistance system 2 can take the initiative on the vehicle-side and after obtaining information about traffic congestion on the route lying ahead of motor vehicle 1 according to automatic route guidance, it can thus of its own accord ask whether it should change the planned route. In this way for example, the information that there is traffic congestion on the route can initially be provided to driver 12 as a voice signal, followed by the question whether route guidance is to be updated or the traffic jam is to be bypassed. In the event of partially autonomous or fully autonomous driving, assistance system 2 can thus offer driver 12 to bypass the traffic jam of its own accord.

Even if for example the tank content is not sufficient to reach a destination of a route stored in the assistance system, assistance system 2 can inform and ask the driver whether it should make a timely refueling stop for example. Alternatively or additionally, assistance system 2 can also ask whether it should drive toward a gasoline station if a defined or specified remaining range for motor vehicle 1 is exceeded. For example, given a remaining range of 50 kilometers or less, a corresponding query regarding an adjustment to route guidance or adjustment to piloted driving can be output to the driver.

Especially in regard to piloted, in other words partially autonomous or highly autonomous or fully autonomous, driving, assistance system 2 can also output a query, which pertains to making a selection among different functions of assistance system 2. For example, driver 12 may be asked whether motor vehicle 1 is to overtake in a piloted driving mode a vehicle ahead, if computing device 5 itself does not provide any clear decision or any clear priority.

In addition, during piloted driving and taking into account a future driving situation, in other words a destination to be reached according to route guidance for example, it may also be announced that the driver is to deactivate piloted driving and take the steering wheel himself. For example, this may be queried if a construction site is located on the route ahead of motor vehicle 1. In this case, the query could prompt the driver to take the steering wheel for this situation, for example in three minutes and/or 5 kilometers, and deactivate piloted driving. In this case, the assistance system function corresponding to this course of action, in other words taking over the steering wheel, would then be an adjustment in the form of shutting off an activated or already provided function of assistance system 2, namely the automatic driving function of assistance system 2. The corresponding query may also comprise a warning message. For example, if assistance system 2 cannot clearly detect a road marking, for example in the area of the construction site, it can output a query that the driver should take over the steering wheel.

If driver 12 is steering motor vehicle 1 manually, the system can output a query whether assistance system 2 should take over the steering wheel, in other words if motor vehicle 1 is on a highway for example or merging on to one, said assistance system can query whether piloted driving should be activated.

Similarly, the vehicle can indicate that a curve located ahead of motor vehicle 1 is tight or the road surface of a road section located ahead of motor vehicle 1 is worn for example, so that he better decrease his speed and correspondingly offer to take this over for him. Also conceivable here is an indication regarding a maximum permitted speed or that driver 12 is driving in the wrong direction, for example in the form of an indication regarding a blocked thoroughfare. In this case, the course of action for the driver relates to reducing the vehicle speed or changing the driving direction and the corresponding function of the assistance system relates to a warning or an offer to change the speed and/or driving direction.

Alternatively or additionally, especially in cases of piloted driving, it is appropriate that one or more entertainment options are offered to driver 12—for example taking into account an expected travel time in piloted driving mode. In this way for example, assistance system 2 can query whether driver 12 would like to continue a language course, for example at a previously reached point. Proposals regarding additional entertainment options defined in their temporal scope, for example movies, may be offered depending on the expected travel time in the piloted driving mode. Lastly, control device 3 can also access the calendar of driver 12 and give him information regarding corresponding entries. In this way, assistance system 2 can inform the driver for example as to whether an appointment in the calendar can still be made on time given the current traffic situation and offer corresponding courses of action or functions of the assistance system 2, such as a route change or a call to other individuals participating in the appointment that cannot be kept.

The invention claimed is:

1. A method for controlling an assistance system of a motor vehicle wherein the assistance system comprises a driver assistance system, the method comprising:
    monitoring, using the driver assistance system, a driving situation of the motor vehicle;
    determining, using a control device of the assistance system, at least one course of action, resulting from the monitored driving situation, for a driver, wherein the determining comprises taking into consideration data retrieved by the control device independently of a user input to the assistance system;
    outputting, using an output device of the assistance system, to the driver a query to provide a function of the assistance system corresponding to the at least one course of action;
    detecting, using a detection device of the assistance system, a response reaction of the driver;
    providing, using the control device, the function of the assistance system depending on the detected response reaction, wherein the function of the assistance system comprises a function of the driver assistance system, which relates to an overtaking procedure and/or a driving lane selection;
    in a partially autonomous or autonomous driving mode and in response to the assistance system not arriving at a clear result in the driving situation, providing, using the assistance system, the driver multiple courses of action; and
    controlling, by the assistance system, the response reaction accordingly so that the control device determining the at least one course of action provides at least two different results, which the control device classifies as being equivalent, wherein the query to provide the function of the assistance system relates to making a selection among the functions, which correspond to the at least two different results.

2. The method according to claim 1, wherein outputting the query comprises outputting the query using a voice output device of the assistance system.

3. The method according to claim 1, wherein:
    the assistance system comprises an information-entertainment system,
    the function of the assistance system comprises a function of the information-entertainment system, and
    the function of the information-entertainment system provides information and/or entertainment content, which is adapted to a habit of the driver stored in the assistance system, a destination stored in the driver assistance system, a route stored in the driver assistance system, a travel time stored in the driver assistance system, and/or an appointment calendar stored in the assistance system.

4. The method according to claim 1, wherein the response reaction is a voice response and the detecting comprises detecting, using a voice detection device of the assistance system, the response reaction.

5. The method according to claim 1, wherein, in the monitored driving situation, the motor vehicle is in an at least partially autonomous driving mode.

6. The method according to claim 1, wherein the function of the assistance system comprises the function of the driver assistance system, which relates to route guidance provided by the driver assistance system.

7. The method according to claim 6, wherein the function of the driver assistance system comprises a drive-stabilizing function outputting a warning message to the driver.

8. The method according to claim 1, wherein determining the at least one course of action comprises evaluating, using the control device, user-related data and/or vehicle-related data.

9. The method according to claim 8, wherein the user-related data comprises an electronic calendar, electronic messages, and/or a usage history of the assistance system.

10. The method according to claim 8, wherein the vehicle-related data comprises a vehicle status, a road status, a driving status, traffic data, and/or world-related data.

11. The method according to claim 10, wherein, the world-related data comprises news and/or weather data, which are retrieved by the control device from a remote computing device.

12. An assistance system for a motor vehicle, the assistance system comprising:
    a driver assistance system configured to monitor a driving situation of the motor vehicle;
    a control device configured to determine for a driver at least one course of action resulting from the monitored driving situation by taking into consideration data retrieved by the control device independently of a user input to the assistance system;
    an output device configured to output a query for providing to the driver a function of the assistance system corresponding to the at least one course of action; and
    a detection device configured to detect a response from the driver,
    wherein the control device is further configured to provide the function of the assistance system depending on the detected response,
    wherein the function of the assistance system comprises a function of the driver assistance system, which relates to an overtaking procedure and/or selecting a driving lane, and
    wherein the assistance system is set up so that if the assistance system does not arrive at a clear result in a partially autonomous or autonomous driving mode when in the driving situation, the assistance system is configured to:
        offer the driver multiple courses of action, and
        control the response accordingly so that the determination of the at least one course of action by the control device provides at least two different results, which the control device classifies as equivalent, wherein the query to provide the function of the assistance system relates to making a selection among the functions, which correspond to the at least one two different results.

13. The assistance system according to claim 12, wherein the output device comprises a voice output device.

14. The assistance system according to claim 12, wherein:
    the assistance system comprises an information-entertainment system,
    the function of the assistance system comprises the function of the information-entertainment system, and
    the function of the information-entertainment system provides information and/or entertainment content, which is adapted to a habit of the driver stored in the assistance system, a destination stored in the driver assistance system, a route stored in the driver assistance system, a travel time stored in the driver assistance system, and/or an appointment calendar stored in the assistance system.

15. The assistance system according to claim 12, wherein the response is a voice response and the detection device comprises a voice detection device.

16. The assistance system according to claim 12, wherein, in the monitored driving situation, the motor vehicle is in an at least partially autonomous driving mode.

17. The assistance system according to claim 12, wherein the function of the assistance system comprises the function of the driver assistance system, which relates to route guidance provided by the driver assistance system.

18. The assistance system according to claim 17, wherein the function of the driver assistance system comprises a drive-stabilizing function outputting a warning message to the driver.

19. The assistance system according to claim 12, wherein the control device is configured to evaluate user-related data and/or vehicle-related data to determine the at least one course of action.

20. The assistance system according to claim 19, wherein:
- the user-related data comprises an electronic calendar, electronic messages, and/or a usage history of the assistance system; and
- the vehicle-related data comprises a vehicle status, a road status, a driving status, traffic data, and/or world-related data.

* * * * *